United States Patent
Rafique et al.

(10) Patent No.: US 11,088,775 B2
(45) Date of Patent: Aug. 10, 2021

(54) SUBCARRIER DIVERSITY IN OPTICAL COMMUNICATION SYSTEMS

(71) Applicant: Xieon Networks S.à.r.l., Luxembourg (LU)

(72) Inventors: Danish Rafique, Munich (DE); Lutz Rapp, Deisenhofen (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/462,845

(22) PCT Filed: Nov. 21, 2017

(86) PCT No.: PCT/EP2017/079846
§ 371 (c)(1),
(2) Date: May 21, 2019

(87) PCT Pub. No.: WO2018/114176
PCT Pub. Date: Jun. 28, 2018

(65) Prior Publication Data
US 2020/0244388 A1    Jul. 30, 2020

(30) Foreign Application Priority Data
Dec. 20, 2016  (EP) .................................... 16205423

(51) Int. Cl.
*H04J 14/02*  (2006.01)
(52) U.S. Cl.
CPC ...... *H04J 14/0298* (2013.01); *H04J 14/0287* (2013.01)
(58) Field of Classification Search
None
See application file for complete search history.

(56) References Cited

U.S. PATENT DOCUMENTS 5,321,541 A * 6/1994 Cohen .................. H04B 10/038
398/144
6,324,318 B1 * 11/2001 Suzuki ................ H04J 14/0221
385/1

(Continued)

OTHER PUBLICATIONS

International Search Report and Written Opinion, PCT/EP2017/079846, dated Feb. 1, 2018, 12 pages.

*Primary Examiner* — David W Lambert

(57) ABSTRACT

Disclosed herein is a method of transmitting a data stream from a first location to a second location through an optical network, as well as a corresponding performance monitoring unit, a transmitting arrangement and a receiving arrangement. The method comprises the steps of transmitting said data stream from said first location to said second location along a working path, wherein said data stream is transmitted in the form of a super channel comprising a number of n wavelengths within a predefined reserved wavelength range, monitoring the performance of the transmission based on the super channel signal received at said second location, and in case the performance is observed to drop below a predetermined performance threshold, unburdening the super channel from a part of said data stream while maintaining the reserved wavelength range for said super channel, by redirecting said part of the data stream for transmittal along at least one restoration path connecting said first and second locations, and transmitting the remainder of said data stream within the super channel on a number of wavelengths that is less than n, and/or with a reduced transmission rate for at least some of the wavelengths in said super channel.

31 Claims, 9 Drawing Sheets

(56) References Cited

U.S. PATENT DOCUMENTS

| | | | | |
|---|---|---|---|---|
| 6,725,401 B1* | 4/2004 | Lindhorst-Ko | ..... | H04J 14/0227 714/47.3 |
| 7,146,098 B1 | 12/2006 | Warbrick | | |
| 2003/0215236 A1* | 11/2003 | Manifold | ............ | H04J 14/0284 398/79 |
| 2007/0280681 A1* | 12/2007 | Frankel | ............... | H04J 14/0295 398/5 |
| 2009/0196602 A1* | 8/2009 | Saunders | ............. | H04B 10/532 398/26 |
| 2014/0186038 A1* | 7/2014 | Frisken | .............. | H04Q 11/0005 398/50 |
| 2014/0199062 A1* | 7/2014 | In De Betou | .... | H04B 10/25753 398/5 |
| 2015/0365186 A1* | 12/2015 | Schimpe | ............ | H04Q 11/0005 398/50 |
| 2016/0261368 A1* | 9/2016 | Maeda | .................. | H04L 1/0009 |

* cited by examiner

SUBCARRIER DIVERSITY IN OPTICAL COMMUNICATION SYSTEMS

RELATED APPLICATIONS

This application is a 35 U.S.C. 371 national stage filing of International Application No. PCT/EP2017/079846, filed on Nov. 21, 2017, which claims priority to European Patent Application No. 16205423.3, filed on Dec. 20, 2016. The entire contents of these applications are incorporated herein by reference in their entirety.

FIELD OF THE INVENTION

The present invention is in the field of optical communication systems. In particular, the present invention relates to a method of transmitting a datastream through an optical network using super channels, as well as a related performance monitoring unit, transmitting arrangement, and receiving arrangement.

BACKGROUND OF THE INVENTION

The transmission of data in optical networks is inevitably exposed to failures that might affect the correct transmission of the data between nodes of the optical network. Such failures may for example be due to transmission fiber impairment, for example due to fiber aging or degradation, nonlinear fiber effects, optical equipment impairment, such as filter drift, optical component aging or outage due to polarization related effects. Further sources of failure can be due to the influence of external factors, such as weather conditions, seismic movements and the like, fiber repair or other kind of maintenance work in the optical network, or negligent human operation. To cope with these types of failure, rerouting strategies and mechanisms are used in the field of optical network management to ensure correct, or at least acceptable, data transmission even when such failures occur. What level of transmission quality to consider acceptable is usually defined in a service level agreement specifying a minimum throughput, transmission rate or transmission quality to be guaranteed to a particular client. When a failure occurs, the compliance with a service level agreement is typically ensured by rerouting all of the traffic being transmitted in an optical network between nodes affected by the failure. Even if a failure causing degradation of transmission performance between two nodes of an optical network rather than complete outage is detected, the affected data is rerouted to be transmitted over an alternative optical path between said two nodes.

However, optical paths exclusively used as a backup, also referred to as protection paths in the art, typically have worse optical characteristics than the working path used under normal working conditions. Consequently, the alternative optical path available in a particular failure situation may not be able to allow transmitting all of the data affected by the failure and hence lead to a violation of the service level agreement.

Moreover, in most cases it will be infeasible to provide "protection" for any path by having a dedicated restoration path on reserve (also referred to as "1+1 protection" in the art), due to lack of available link resources and the operational costs of associating a backup link for every connection. Instead of "protection", in most applications one would try to dynamically find a "restoration path" by the time a deficiency or failure of the working path is observed. However, finding a suitable restoration path will take some time (also referred to as "switch over time" in the art), and until the restoration path is found and established, a significant amount of traffic will be delayed or even lost. Moreover, in many cases the restored path will have conditions completely different from the working path, and it may turn out that the restored path does not allow to make up for the full traffic of the previous working path. Finally, in some cases it will turn out that no suitable restoration part can be found, such that further intervention may become necessary to reduce the throughput.

Further, besides a minimum level of transmission security and transmission quality, the market increasingly calls for higher transmission rates in order to satisfy the demands for more transmission capacity in optical communication systems. One way to increase the spectral efficiency is based on so-called "super channels". In a super channel, a number of sub-channels or "carriers" having spectrally disjunctive wavelengths are packed in a fixed band width and are treated as a single channel in the network. This means that carriers constituting the super channel need not be individually guided by means of filters or the like upon traversing the network, and that consequently the individual channels of the super channel can be more densely spaced as compared to individually switched ordinary wavelength-division multiplexing (WDM) channels, so that more information can be transmitted per band width as compared to ordinary WDM channels. This is schematically shown in FIG. 1, where a super channel with four sub-channels or carriers represented by wavelengths $\lambda_1$ to $\lambda_4$ is shown. The super channel is defined by a certain reserved wavelength range having a width L. As is seen in FIG. 1, the reserved wavelength range provides for some margin to the left of the shortest wavelength $\lambda_1$ and to the right of the longest wavelength $\lambda_4$, which is also referred to as a guard band in the art. The guard band is necessary to prevent to the extent possible that the outermost carriers at $\lambda_1$ and $\lambda_4$, the so-called "edge carriers", are affected by the filters passed under way, which filters will in practice not be perfectly steep and not perfectly tuned. However, since all four carriers $\lambda 1$ to $\lambda_4$ are routed through the network as part of the same super channel, no guard bands between the individual carriers are necessary, such that the individual carriers can be closely spaced as indicated in FIG. 1.

The combination of high demands with regard to both, quality and safety of transmission as well as transmission rate call for new solutions regarding the management and protection of optical traffic.

Wavelength division multiplexing (WDM) stands for increasing the capacity of optical communication systems by transmitting data via several modulated lightwaves simultaneously over a single optical fiber at different wavelengths or frequencies. Thanks to the different wavelengths, the lightwaves can be separated after transmission. In optical communications, electromagnetic waves propagating within an optical waveguide such as an optical fiber are commonly characterized by their wavelength, or more precisely by the wavelength they would have under vacuum. The real wavelength in the transmission medium is typically by a factor of around 1.5 smaller. In contrast, electromagnetic waves are characterized by their frequency in radio communications. Astonishingly, the separation of the different lightwaves is almost exclusively indicated in terms of frequency. Typically, but not always, the spacing between two neighboring channels is constant in terms of frequency.

However, the terms frequency and wavelength can be used exchangeably in the following considerations since they are tightly linked to each other. In fact, the product of frequency f and wavelength λ is constant, and it is equal to the velocity of light in vacuum $c_0$. Thus, a wavelength spacing |Δλ| is linked to the corresponding frequency spacing |Δ f| by $$|\Delta \lambda| = \frac{c_0}{f^2} \cdot |\Delta f| = \frac{\lambda^2}{c_0} \cdot |\Delta f|.$$

Thus, a constant spacing in the frequency domain will result in a slightly varying spacing in the wavelength domain. However, when considering the so-called conventional band (C-band) predominantly used nowadays for data communication, the variation amounts to around 2% and will not be visible in the following drawings.

SUMMARY OF THE INVENTION

A goal underlying the present invention is to provide a new solution in the transmission of a data stream from a first location to a second location through an optical network, wherein said data stream is transmitted in the form of a super channel. This goal is achieved by each of a method, a performance monitoring system, a transmitting arrangement, and a receiving arrangement, each according to the present invention, as is further described herein with reference to certain aspects and certain embodiments which are set forth by way of example and illustration, and without limitation. The various aspects and embodiments of the present invention disclosed and described herein shall not operate to limit the scope of the below claims, except only if and to the limited extent that any of the below claims expressly recite any one or more limitations of such disclosed and described aspects and embodiments of the present invention.

The invention relates to a method of transmitting a data stream from a first location to a second location through an optical network. The method comprises a step of transmitting said data stream from said first location to said second location along a working path established in said optical network, wherein said data stream is transmitted in the form of a super channel comprising a number of n wavelengths within a predefined reserved wavelength range. Herein, a "data stream" refers to any kind of information traffic that may be encoded in an optical signal. In particular, a "data stream" in the sense of the present invention should not be understood to be limited to concrete pieces of information, but rather to an amount of data or information to be continuously transmitted per unit time. The term "continuously" does not exclude the data stream from being transmitted in bursts.

An "optical network" refers herein to a plurality of optical nodes interconnected by optical links. Information may be transmitted between terminal nodes in the form of optical signals propagating along paths connecting said terminal nodes via any number of intermediate nodes and links between each pair of nodes. The first and second locations referred to above may correspond to any kind of element of an optical network placed at an optical node of said optical network. A "super channel" refers herein to a bundle of channels or carriers constituting a multi-wavelength signal which is brought into service and treated by the optical network like a single channel.

The "working path" refers herein to an optical path connecting the first location and the second location with each other. The working path is the optical path along which the data stream is transmitted under normal working conditions of the optical network.

The method further comprises a step of monitoring the performance of the transmission based on the super channel signal received at said second location, and in case the performance is observed to drop below a predetermined performance threshold, unburdening the super channel from a part of said data stream while maintaining the reserved wavelength range for said super channel by redirecting said part of the data stream for transmittal along a restoration path connecting said first and second locations, said restoration path being different from said working path, and transmitting the remainder of said data stream within the super channel on a number of wavelengths that is less than n, and/or with a reduced transmission rate for at least some of the wavelengths in said super channel.

In other words, according to the invention, in case it is observed that the performance of the super channel transmitted along the working path is insufficient, this working path is not abandoned in favor of an alternative path, but the super channel is only "unburdened" to some extent, to thereby improve the transmission performance. Preferably, the working path and the alternative path lead across geographically disjunct routes. Herein, the unburdening of the super channel comprises redirecting a part of the data stream to be transmitted along the restoration path, which is an alternative optical path connecting the first and second locations to each other than the working path. The remainder of the data stream is still transmitted along the working path within the original super channel, but since the amount of data to be transmitted in the super channel along the working path has decreased, it becomes e.g. possible to transmit the remainder of the data on a number of wavelengths that is less than n, while remaining within the original predefined reserved wavelength range that characterises the super channel. A reduction of the number of wavelengths transmitted within the super channel over the working path leads to reduced interference caused by nonlinear fiber effects. Furthermore, it allows for an increased wavelength separation between the individual carriers, which can result in the suppression of interference effects, e.g. crosstalk due to imperfect filtering, between the individual carriers and hence in an improvement of the performance of the transmission of said remainder of the data stream.

Also, instead of or in addition to increasing the wavelength separation of the individual carriers, it is also possible to increase one or both of the guard bands of the super channel, i.e. the spectral distance between the outer carriers (i.e. the carriers with the highest and lowest wavelength, respectively, within the super channel) and the spectral boundary of the super channel. This way, performance loss due to filter drifts can be reduced.

In addition or alternatively, the remainder of said data stream that continues to be transmitted in the super channel over the working path may be transmitted with a reduced transmission rate for at least some of the wavelengths in the super channel. Herein, the "reduced transmission rate" can mean that the symbol rate is decreased, or that the order of the modulation format is lowered, in the sense that the number of constellation points per symbol is decreased. Both of these measures make it easier to maintain a desired transmission performance in spite of fiber or equipment impairments of the type described above.

Note that in case the performance of transmission along a working path is found to be not adequate, in conventional methods one would have rerouted the complete datastream along an alternative path, such as a protection path reserved in advance or an alternative path established by the time the performance failure is detected. In contrast to this, the method of the invention follows a different approach: In case of performance failure in the transmission via the super channel on the working path, the super channel as such, i.e. the reserved wavelength range that is routed as a whole along said working path, is maintained, but the super channel is only unburdened from part of the datastream in the manner described above, which will allow to obtain the desired performance on the working path again. This way, the working path can still be maximally exploited, and only a fraction of the datastream originally transmitted on the working path needs to be transmitted on a restoration path, which makes it more affordable to reserve such restoration part in advance, or less demanding to allocate such restoration path when it is needed. Moreover, this allows to dynamically adjust the payload on the working path and restoration path to fine-tune the traffic to maximally exploit the available resources while still ensuring proper performance of the transmission.

In a preferred embodiment, said part of the redirected data stream is chosen such that the performance of the transmission of the remainder of said data stream within the super channel exceeds said predetermined performance threshold. This way it is ensured that the whole data stream is transmitted between the first and the second location with a desired transmission quality reflected by the predetermined performance threshold.

According to preferred embodiments of the invention, the method further comprises a step of additionally monitoring the performance of the transmission of the redirected part of the data stream via said restoration path, and dynamically adjusting the share of the redirected data stream and of the remainder of the data stream based on the two monitored performances. Thereby it is possible to adapt the amount of data transmitted through the working path and/or through the restoration path in real time, i.e. according to current transmission and working conditions of the optical network, and to at any time obtain an optimum compromise between the performance on the working path and restoration path. Herein, an optimum compromise could correspond to the same performance level on both paths, but depending on the service level agreement, which may assign different priorities to respective parts of the data contained in said datastream, it may be preferred to have better performance on the working path at the expense of a slightly worse performance on the restoration path. In both cases, however, it is advantageous to monitor the performance of transmission on both paths such as to make an educated choice.

In a preferred embodiment of the invention, said redirected part of the data stream is transmitted along said restoration path with a reduced transmission rate per wavelength as compared to the transmission rate of the working path. As mentioned before, a reduced transmission rate for a given wavelength can be due to a reduced symbol rate, a lower order modulation format, or both, and each of this will make it easier to obtain a desired transmission performance. The decreased transmission rate per wavelength can be compensated by increasing the total number of sub-channels used on both, the working path and the restoration path as compared to the original number of wavelength or carriers in the super channel, as will become more apparent from the specification below.

In a preferred embodiment of the invention, the remainder of the datastream is transmitted within the super channel on the working path on a subset of the original n wavelengths, wherein in said subset,
- one or both of the largest and smallest among the n original wavelengths is missing, and/or
- wavelengths are missing which were mutually non-adjacent in the original set of n wavelengths.

Note that the largest and smallest wavelengths among the n original wavelengths are the edge carriers within the super channel, i.e. those that are most prone to be affected by filter drifts, and hence the most likely to lead to reduced performance. Accordingly, by dispensing with these wavelengths in the super channel on the working path, the performance will typically be improved. Further, by reducing mutually non-adjacent wavelengths from the original n wavelengths in the super channel, the spectral distance between the remaining wavelengths is increased, which leads to a decrease of interference between these wavelengths due to nonlinear effects. This way too, the performance can be successfully improved. In a preferred embodiment of the invention, said redirected part of the data stream is transmitted along said restoration path in the form of a super channel as well.

In a preferred embodiment of the invention, said performance is monitored by analyzing one or more performance indicators, wherein said performance indicators preferably comprise one or more of high error rate contributors (HERC), signal-to-noise-ratio (SNR), power spectral density (PSD), pre-forward-error-correction (FEC) bit error rate, post-FEC bit error rate, rate of corrected symbols, peak-to-average ratio, and error vector magnitude (EVM).

According to a preferred embodiment of the invention, said predetermined performance threshold is chosen according to a service level agreement. A "service level agreement" refers herein to a predetermined stipulation or instruction regarding the quality of transmission provided to a particular optical network client or user. In a preferred embodiment of the invention, said data stream is a predefined amount of data traffic under a service level agreement.

According to a preferred embodiment of the invention, said redirecting of said part of said data stream is carried out by using wavelength selective switches (WSSes).

According to a preferred embodiment of the invention, said redirecting of said part of said data stream is carried out by means of a cyclic filter in combination with a suitable control of the transmitted wavelengths.

In a preferred embodiment of the invention, the method further comprises a step of buffering one of said redirected part of the data stream and said remainder of the data stream, such as to compensate for a difference in optical path lengths of said working path and said restoration path. The step of buffering provides a way of re-synchronising the different parts of the data stream in order to reconstruct the original data stream.

In a preferred embodiment of the invention, said step of reducing the transmission rate for a given wavelength in said super channel comprises changing the modulation format and/or the symbol rate of the corresponding optical signal.

According to a preferred embodiment of the invention, the method further comprises a step of establishing said restoration path in response to the monitored performance being observed to approach said predetermined performance threshold. In other words, according to this embodiment, the performance is monitored with time, and if it is observed that the predetermined performance threshold may be reached in the near future, the restoration path is established.

Herein, "observed to approach" may relate to any suitable way of extrapolating the monitored performance such as to detect a certain likelihood that the performance falls below the predetermined threshold within a certain future timeframe, meaning that the redirection of part of the data stream along a suitable restoration path is likely to become expedient within this timeframe. This leaves sufficient time for establishing the restoration path before it is actually needed, while avoiding to reserve the restoration path unnecessarily long in advance.

A further aspect of the invention relates to a performance monitoring unit for monitoring and controlling the transmission of a data stream in the form of a super channel from a first location to a second location through an optical network, wherein the super channel comprises a number of n wavelengths within a predefined reserved wavelength range. The performance monitoring unit is configured for:

monitoring the performance of a transmission of the data stream from said first location to said second location along a working path established in said optical network based on the super channel signal received at said second location; and in case the performance is observed to drop below a predetermined performance threshold, unburdening the super channel from a part of said data stream while maintaining the reserved wavelength range for said super channel, by controlling components within said optical network for:

redirecting said part of the data stream for transmittal along a at least one restoration path connecting said first and second locations, said at least one restoration path being different from said working path, and transmitting the remainder of said data stream within the super channel on a number of wavelengths that is less than n, and/or with a reduced transmission rate for at least some of the wavelengths in said super channel.

In a preferred embodiment of the invention, the performance monitoring unit is further configured for controlling components within said optical network for redirecting said part of the redirected data stream such that the performance of the transmission of the remainder of said data stream within the super channel exceeds said predetermined threshold.

According to a preferred embodiment of the invention, the performance monitoring unit is further configured for additionally monitoring the performance of the transmission of the redirected part of the data stream via said restoration path, and for controlling components within said optical network for dynamically adjusting the share of the redirected data stream and of the remainder of the data stream based on the two monitored performances.

In a preferred embodiment of the invention, the performance monitoring unit is further configured for controlling components within said optical network for transmitting said redirected part of the data stream along said restoration path with a reduced transmission rate per wavelength as compared to the transmission rate of the working path.

According to a preferred embodiment of the invention, the performance monitoring unit is further configured for controlling components within said optical network for transmitting said redirected part of the data stream along said restoration path in the form of a super channel as well.

In a preferred embodiment of the invention, the performance monitoring unit is further configured for monitoring the performance by analyzing one or more performance indicators, wherein said performance indicators preferably comprise one or more of high error rate contributors (HERC), signal-to-noise-ratio (SNR), power spectral density (PSD), pre-forward-error-correction (FEC) bit error rate, post-FEC bit error rate, rate of corrected symbols, peak-to-average ratio, and error vector magnitude (EVM).

According to a preferred embodiment of the invention, the performance monitoring unit is further configured for establishing said restoration path in response to the performance being observed to approach said predetermined performance threshold.

In a preferred embodiment of the invention, the performance monitoring unit is further configured for calculating a prediction for the performance or one or more performance indicators expected at a future time, distant from a present time by at least the time required to detect a change in the one or more performance indicators and to carry out said step of unburdening the super channel. For example, the performance monitoring unit can constantly monitor the performance and extrapolate the performance such as to make a prediction for the performance at said future time. The prediction shall be far enough into the future that by the time the predicted performance drops below said predetermined performance threshold, there is still sufficient time for the communication and reconfiguration needed for redirecting the part of the data stream for transmittal along the restoration path and reconfiguring the transmittal of the remainder of the data stream within the super channel on the working path in the way described above.

A further aspect of the invention relates to a transmitting arrangement for transmitting a data stream in the form of a super channel from a first location to a second location through an optical network along a working path, and optionally along a restoration path, wherein the working path and the restoration path connect said first and second locations, the restoration path being different from the working path, wherein the super channel comprises a number of n wavelengths within a predefined reserved wavelength range.

The transmitting arrangement of the invention comprises at least n light sources configured to emit the n wavelengths constituting the carriers of said super channel. The transmitting arrangement further comprises one or more modulators for modulating said carriers with data such as to generate optical data signals; and a redirecting device. The redirecting device is configured for selectively redirecting part of said optical data signal for transmittal along the restoration path, and for transmitting the remainder of the optical data signal along the working path. The transmitting arrangement is further configured for transmitting the remainder of said data stream within the super channel on a number of wavelengths that is less than n, and/or with a reduced transmission rate for at least some of the wavelengths in said super channel.

According to a preferred embodiment of the invention, the redirecting device comprises a cyclic filter. The cyclic filter preferably comprises a number N of inputs greater than or equal to the number n of wavelengths in the super channel, and at least two outputs, and is configured for directing an optical signal entering one of the inputs to one of the outputs according to the wavelength of the optical signal. By appropriately connecting the light sources to the optical network through the cyclic filter, the individual channels of the super channel may be redirected along the restoration path or transmitted along the working path according to their wavelength. Hence the functionality of a cyclic filter allows implementing the method of the invention in a simple and cost-effective way and with a minimum number of required connection ports. The cyclic filter, the n light sources, and/or the modulator may be comprised in an integrated device, such as on a transponder card.

According to a preferred embodiment of the invention, the redirecting device comprises a wavelength selective switch (WSS). Preferably, the wavelength selective switch comprises a number N of inputs greater than or equal to the number n of wavelengths in the super channel, and at least two outputs, one of which being connected to the working path and the other directed to the restoration path. The WSS is configured for selectively directing an optical signal at one of its inputs to a selected one of its outputs, based on the wavelength of the signal, such that said optical signal can be redirected along the restoration path or transmitted along the working path according to its wavelength. The wavelength selective switch, the n light sources, and/or the modulator may be comprised in an integrated device, such as on a transponder card.

In a preferred embodiment of the invention, each of the at least n light sources can emit light at each of the n wavelengths of the super channel. As will become more apparent from an exemplary embodiment described below, this way the redirection of part of the datastream can be easily effected by appropriate wavelength control of the light sources.

According to a preferred embodiment of the invention, the transmitting arrangement further comprises one or more additional light sources, wherein each additional light source can emit light at each of the n wavelengths of the super channel. The one or more additional light sources are "additional" in the sense that they are not used for transmitting the data stream under normal operating conditions, i.e. in the absence of disturbances causing the performance to drop below the predetermined performance threshold. Hence the transmitter comprises a number of light sources greater than the number n of wavelengths of the super channel. This allows reducing the transmission rate of some of the individual carriers, in particular the edge carriers, while still transmitting the data stream as a whole with the same data rate.

In a preferred embodiment of the invention, the predefined reserved wavelength range has a width of between 0.8 nanometers and 5.0 nanometers, preferably between 0.8 nanometers and 3.2 nanometers.

According to a preferred embodiment of the invention, the n channels are spaced apart by a frequency difference between 20 GHz and 100 GHz, preferably between 30 GHz and 50 GHz.

In a preferred embodiment of the invention, each of the n wavelengths carry the data stream with a transmission rate between 40 Gbit/s and 1 Tbit/s, preferably between 100 Gbit/s and 500 Gbit/s.

A further aspect of the invention relates to a receiving arrangement configured for receiving a data stream from a transmitting arrangement of one of the embodiments described above. The receiving arrangement is configured to selectively receive a datastream, from said transmitting arrangement, in the form of a super channel comprising a number of n wavelengths within a predefined reserved wavelength range via a working path, or a redirected part of said data stream via at least one restoration path, and the remainder of said data stream within the super channel via said working path, said remainder of said data stream being transmitted on a number of wavelengths that is less than n and/or with a reduced transmission rate for at least some of the wavelengths in said super channel, wherein the receiving arrangement further comprises at least one buffer configured for buffering said redirected part of said data stream and said remainder of said data stream; such as to compensate for a difference in optical path lengths of said working path and said restoration path.

DESCRIPTION OF PREFERRED EMBODIMENTS

Figure 1:
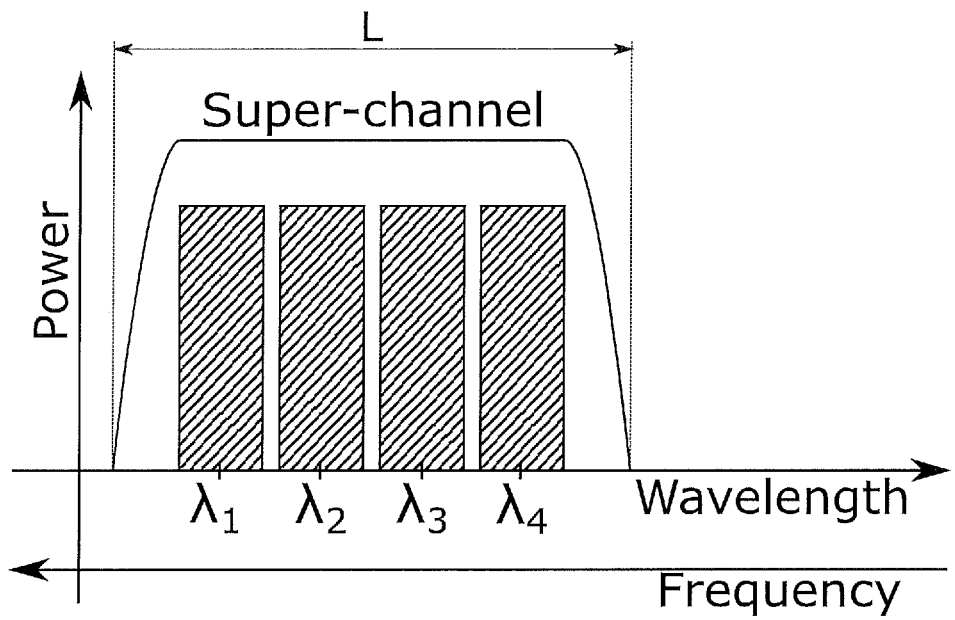
FIG. 1 shows a schematic view of a super channel.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figure 2:
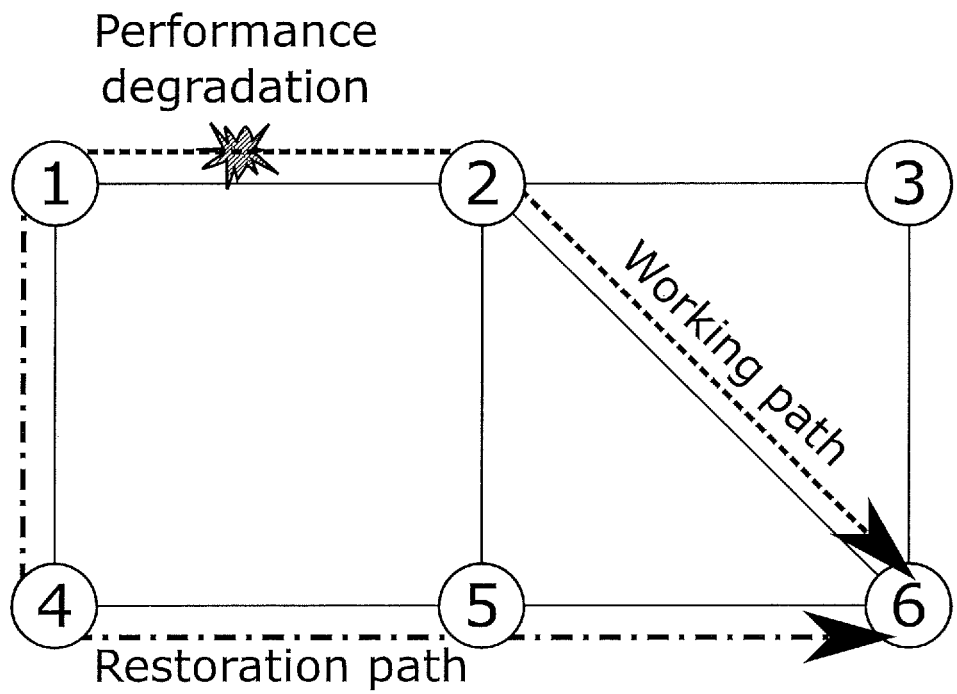
FIG. 2 shows a schematic representation of an optical network in which a working path and a restoration path are established.

FIG. 2 schematically shows an optical network comprising six nodes 1 to 6 connected by optical links. According to an embodiment of the method of the invention, a data stream is transmitted from a first location at node 1 to a second location at node 6 along a working path via node 2, wherein the data stream is transmitted in the form of a super channel like that shown in FIG. 1. The performance of the transmission of the data stream between node 1 and node 6 is monitored based on the super channel signal received at node 6. In the case shown, there is some performance degradation along the working path between node 1 and node 6 (more precisely between node 1 and intermediate node 2) which leads said performance to drop below a predetermined performance threshold.

When this happens, the super channel is unburdened from a part of the data stream while maintaining the reserved wavelength range (i.e. the wavelength range L shown in FIG. 1) for said super channel, by redirecting a part of the data stream for transmittal along a restoration path connecting node 1 and node 6 via nodes 4 and 5. The remainder of the data stream continues to be transmitted along the working path between node 1 and node 6 via node 2 within the super channel. However, since now only a fraction of the original data stream (the "remainder" as referred to herein) needs to be transmitted via the super channel, this remainder can be transmitted on a number of wavelengths that is less than the number of wavelengths originally comprised in the super channel. In other words, depending on the fraction of the data stream or traffic redirected along the restoration path, the remainder can for example be transmitted on two or three wavelengths within the super channel only. Thus, performance is already improved thanks to reduced nonlinear interaction. Since this furthermore allows to increase the size of the guard bands and/or the spectral distance between neighboring carriers, this may lead to an additional improvement of the performance of the transmission along the working path. In addition or alternatively, the reduced payload on the working path would also allow for reducing the transmission rate for at least some of the wavelengths in the super channel, which likewise allows for improving the transmission performance.

Note that conventionally, detecting insufficient transmission performance would have typically caused a network management system to redirect the entire data stream along a restoration path or, if present, a protection path. According to the present invention, however, the super channel as such is maintained on the working path, but it is only "unburdened" from some of its traffic to thereby facilitate maintaining the required performance on the super channel. This removal of traffic from the super channel can be carried out dynamically and precisely to the extent that the desired performance is reached, thereby exploiting the current physical capability of the working path as much as possible, i.e. with optimum efficiency. Also, since the super channel is maintained, no reconfiguration of the working path is required.

The restoration channel can be calculated in advance, or can be calculated when the monitoring of the performance of the transmission based on the super channel along the working path indicates that due to gradual degradation or the like, the performance is expected to drop below a predetermined performance threshold in the near future. Since the restoration channel only needs to transmit a fraction of the original data stream, it is comparatively easy to find a suitable restoration path with sufficient resources for the redirected part of the data stream.

Importantly, the share of the redirected datastream and the remainder of the data stream can be dynamically adjusted, to give an optimum overall result. For this purpose, in preferred embodiments of the invention, the performance of both, the transmission of the redirected part and of the remainder of the data stream received along the restoration and working paths, respectively, is monitored, and the shares of these parts are adjusted based on the two monitored performances. This would in particular allow for increasing the traffic on the working path again, if the working path has recovered from transient complications or due to maintenance work.

Note further that according to the wording used herein, every data stream currently transmitted on the working path can be regarded as the "original data stream", i.e. irrespectively of whether an even larger data stream has previously been transmitted on the working path. This is because the redirection of part of the current data stream is a dynamical process, but at any point in time, there is a possibility to redirect part of the current data stream transmitted along the working path in the form of said super channel.

Figure 3:
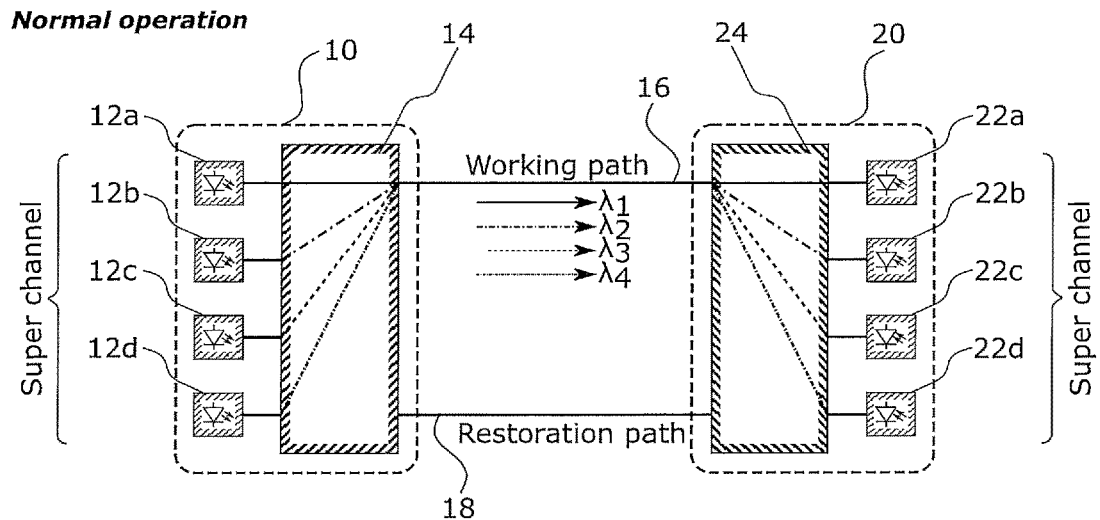
FIG. 3 shows a redirection of individual carriers of a super channel according to an embodiment of the invention.
Figure 3:
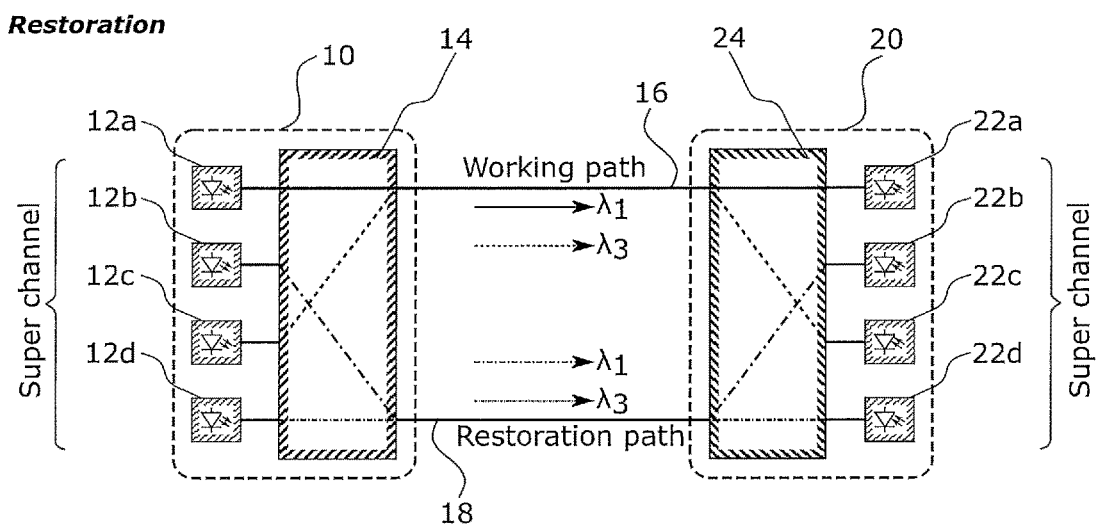

With reference to FIG. 3, an embodiment of the method and apparatus of the invention is described. FIG. 3 shows a transmitting arrangement 10, comprising first to fourth light sources 12a to 12d and a redirecting device 14 which in the embodiment shown is formed by a cyclic filter. The cyclic filter 14 has on its left side first to fourth input ports, which are connected with the first to fourth light sources 12a to 12d, respectively. The cyclic filter 14 further has on its right side first to fourth output ports, of which the first output port is connected with a working path 16 and the fourth output port is connected with a restoration path 18. The second and third output ports of the cyclic filter 14 are not occupied and hence not shown in the Figure. However, the protection path could also be connected to any of these ports. Furthermore, unused ports might be termined inside of housing of the cyclic filter and thus might not be visible from outside.

Further shown in FIG. 3 is a receiving arrangement 20 which includes first to fourth receiving units 22a to 22d and a redirecting device, which is formed by a further cyclic filter 24. The cyclic filter 24 has four input ports on its left side, of which the first is connected with the working path 16 and the fourth is connected with the restoration path 18, while the second and third input ports are not occupied. On its right side, the cyclic filter 24 has first to fourth output ports connected to the first to fourth receiver units 22a to 22d, respectively.

Shown in the table below is the connectivity of the cyclic filters 14, 16 depending on the wavelength.

|  | Output port 1 | Output port 2 | Output port 3 | Output port 4 |
|---|---|---|---|---|
| Input port 1 | $\lambda_1$ | $\lambda_2$ | $\lambda_3$ | $\lambda_4$ |
| Input port 2 | $\lambda_2$ | $\lambda_3$ | $\lambda_4$ | $\lambda_1$ |
| Input port 3 | $\lambda_3$ | $\lambda_4$ | $\lambda_1$ | $\lambda_2$ |
| Input port 4 | $\lambda_4$ | $\lambda_1$ | $\lambda_2$ | $\lambda_3$ |

In the situation of normal operation, shown in the upper half of FIG. 3, the first to fourth light sources 12a to 12d emit wavelengths $\lambda_1$ to $\lambda_4$, respectively, which according to the connectivity table above means that all four wavelengths are sent via the first output port to the working path 16, where they form the super channel. At the receiving arrangement 20, the performance of the super channel transmission is monitored. In particular, the monitoring comprises analyzing one or more performance indicators, such as high error rate contributors (HERC), signal-to-noise ratio (SNR), power spectral density (PSD), pre-forward-error-correction (FEC) bit error rate, post-FEC bit error rate, rate of corrected symbols, peak-to-average ratio, and error vector magnitude (EVM). When it is determined that the performance as indicated by the performance indicator drops below a predetermined performance threshold, the transmitting arrangement 10 is controlled by a performance monitoring unit (not shown) to change the wavelength of the second light source 12b from $\lambda_2$ to $\lambda_1$ and the wavelength of the fourth light source 12d from $\lambda_4$ to $\lambda_3$. Consequently, the carriers generated by the second and fourth light sources 12b and 12d, respectively, are redirected to the fourth output port of the cyclic filter 14, and hence transmitted via the restoration path 18, as shown in the lower half of FIG. 3.

At the receiving arrangement 20, the cyclic filter 24 redirects the light received at its fourth input port from the second and fourth light sources 12b and 12d, to the second and fourth receiving units 22b, 22d, respectively, as before.

Accordingly, from the receiving arrangement's point of view, nothing has changed, except that the second and third receiving units 22b, 22d receive different wavelengths. Note in this regard that the cyclic filter 14, 24 is symmetrical or reciprocal with regard to the input and output ports, or in other words, that the table above is mirror symmetric with regard to its diagonal.

As is seen from the above embodiment, by using cyclic filters 14, 24, the redirection of individual carriers of the super channel can be carried out simply by a suitable control of the wavelengths at the transmitting arrangement 10. For this purpose, the light sources 12a to 12d must be wavelength adjustable, in the sense that every light source 12a to 12d has to be capable of producing light with the wavelength of each of the carriers of the super channel.

Since the super channel now only includes two carriers instead of four, the spectral distance between the two remaining wavelengths ($\lambda_1$ and $\lambda_3$) has been increased, thereby reducing performance losses due to nonlinear effects occurring when the carriers are located spectrally closely together. Moreover, the super channel no longer has to carry the edge wavelength $\lambda_4$, which is likely to suffer from filtering effects upon passing the filters (not shown) provided on the working path 16. Accordingly, it can be expected that the performance of the received super channel is increased to above the predetermined performance threshold.

Figure 4:
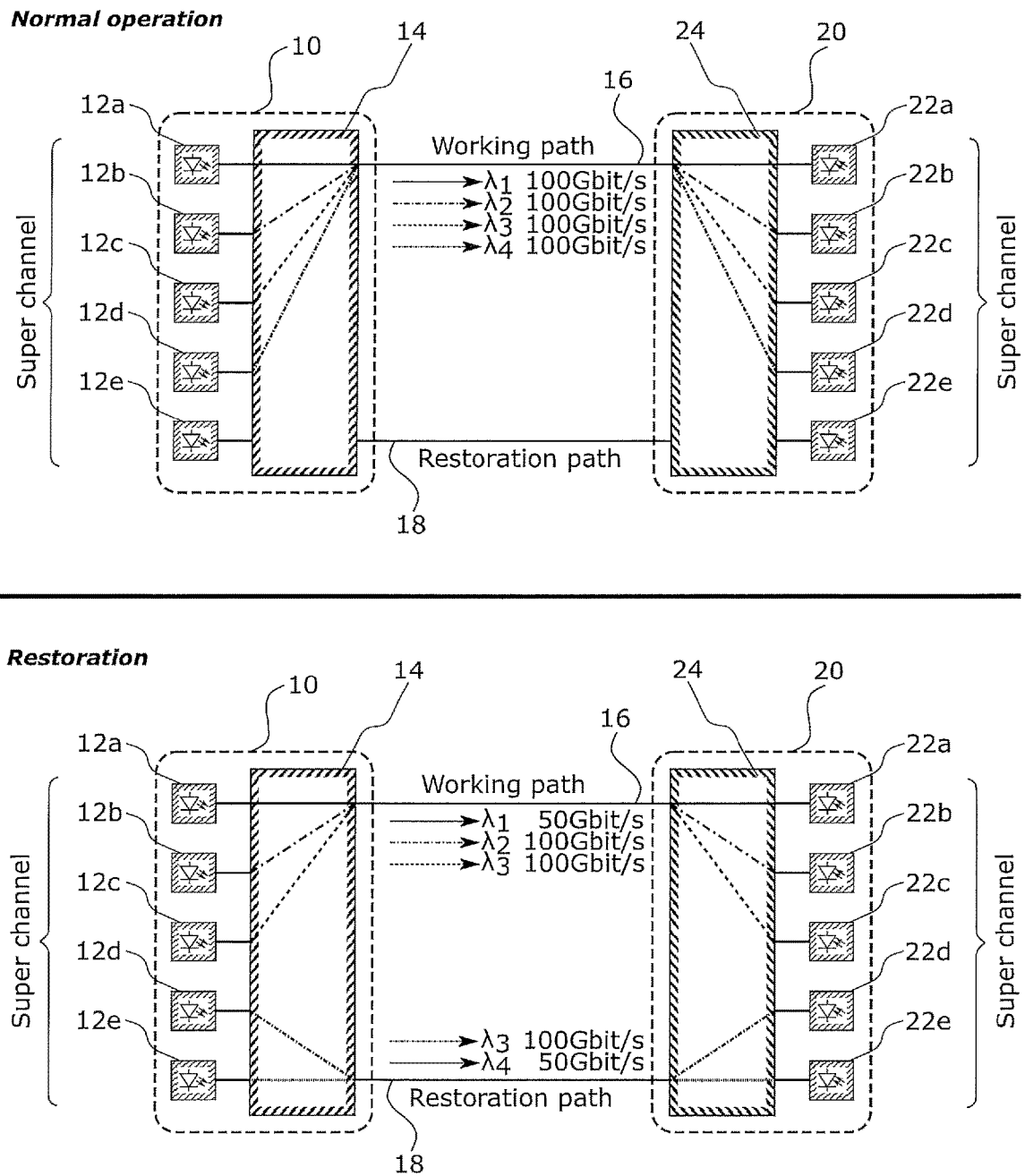
FIG. 4 shows a redirection of individual carriers of a super channel and change of transmission rate according to an embodiment of the invention.

FIG. 4 discloses a further embodiment, which is similar to that of FIG. 3, except that the transmitting arrangement 10 comprises an additional fifth light source 12e connected to a fifth input port of the redirecting device 14 and the receiving arrangement 20 comprises a fifth receiver unit 22e connected to a fifth output port of the redirecting device 24. The connectivity of the redirecting devices 14 and 24 is shown in the table below.

|  | Output port 1 | Output port 2 | Output port 3 | Output port 4 | Output port 5 |
|---|---|---|---|---|---|
| Input port 1 | $\lambda_1$ | $\lambda_2$ | $\lambda_3$ | $\lambda_4$ | $\lambda_5$ |
| Input port 2 | $\lambda_2$ | $\lambda_3$ | $\lambda_4$ | $\lambda_5$ | $\lambda_1$ |
| Input port 3 | $\lambda_3$ | $\lambda_4$ | $\lambda_5$ | $\lambda_1$ | $\lambda_2$ |
| Input port 4 | $\lambda_4$ | $\lambda_5$ | $\lambda_1$ | $\lambda_2$ | $\lambda_3$ |
| Input port 5 | $\lambda_5$ | $\lambda_1$ | $\lambda_2$ | $\lambda_3$ | $\lambda_4$ |

Under normal operation, the situation is the same as in FIG. 3, i.e. optical signals generated by the first to fourth light sources 12a to 12d are jointly transmitted as a super channel on the working path 16, where in this embodiment each wavelength carries data at a data rate of 100 Gbit/s. The total data stream is therefor transmitted at a rate of 400 Gbit/s. When the performance of the received super channel decreases below the predetermined performance threshold, in this embodiment the wavelengths of the first to third light sources 12a to 12d remain unchanged, and hence continue to be part of the super channel. However, the transmission rate of the lowest wavelength $\lambda_1$, i.e. the edge channel that is particularly prone to performance loss, is reduced from 100 Gbit/s to 50 Gbit/s only. This can e.g. be achieved by changing the modulation format to a modulation format with less constellation points per symbol, or decreasing the symbol rate of the optical signal at wavelength $\lambda_1$. Although not shown in the figures for simplicity, the skilled person will appreciate that the transmitting arrangement 10 further comprises suitable modulators that allow for adjusting the modulation format and the symbol rate.

In addition, the wavelength of the fourth light source 12d is changed to $\lambda_3$ such that it is directed to the restoration path 18. Since the first wavelength $\lambda_1$ only carries data at a data rate of 50 Gbit/s, to account for the full data stream with a rate of 400 Gbit/s, another 50 Gbit/s are missing. These missing 50 Gbit/s are provided by the fifth light source 12e (and corresponding modulator, not shown) and are transmitted via the restoration path 18 as well. In this case too, the super channel on the working path is maintained, but it is unburdened from its one wavelength $\lambda_4$. Moreover, while the other edge wavelength $\lambda_1$ is still present, the super channel is unburdened with regard to this wavelength as well due to the reduced transmission rate. Accordingly, it is expected that the performance of the transmission of the remaining part of the datastream in the super channel is increased.

Figure 5:
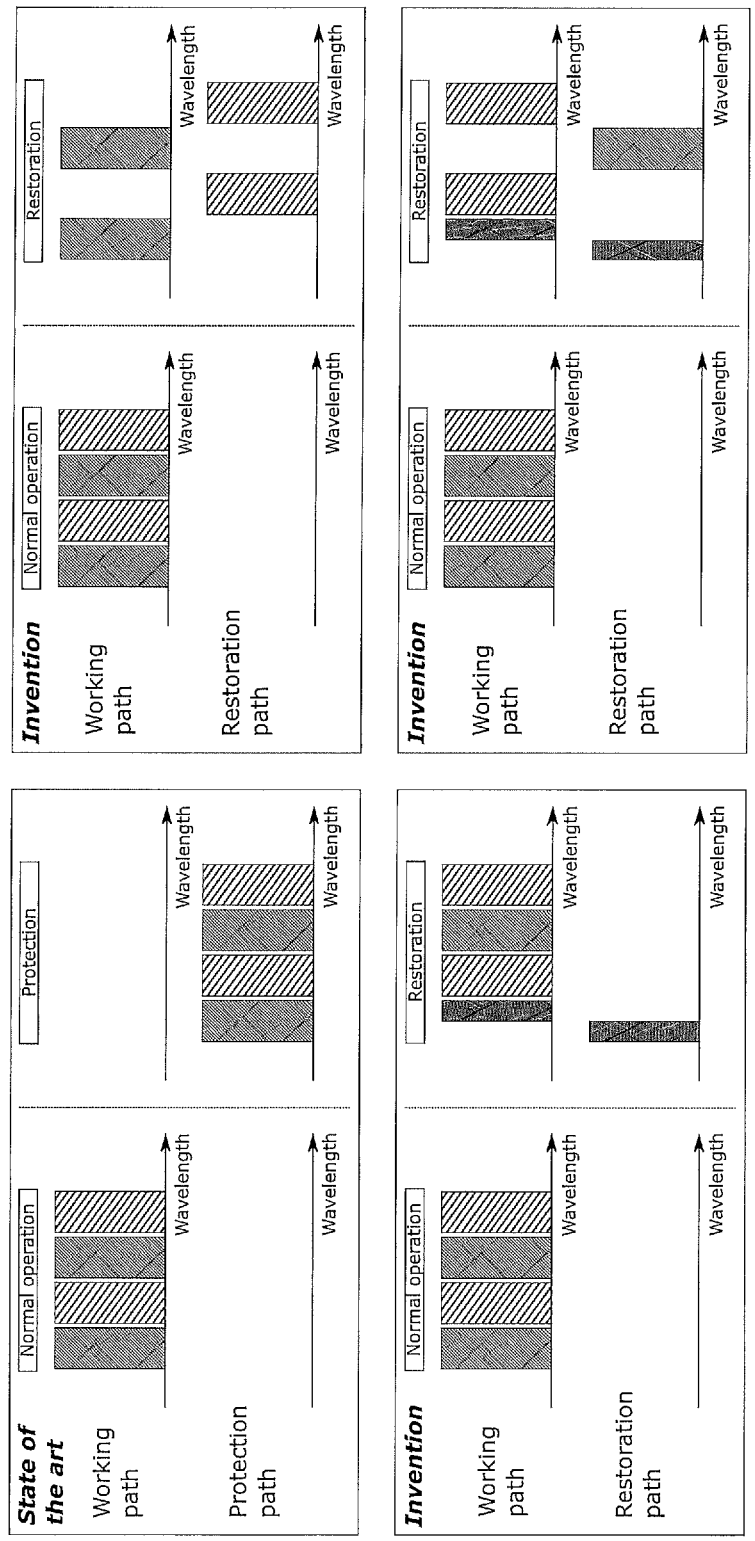
FIG. 5 shows various examples of a redistribution of the carriers of a super channel according to an embodiments of the invention.

FIG. 5 schematically shows favorable transmission rate and wavelength assignments during normal operation and when part of the datastream is redirected for transmittal along the restoration path 18. In FIG. 5, if a carrier of the super channel is shown to be narrow, this shall mean that this wavelength is utilized at a reduced transmission rate.

The diagram on the top left shows for comparison the complete rerouting of the four carrier super channel from the working path to a protection path, which would resemble the ordinary practice known from prior art. The diagram on the top right shows a situation where the first and third carriers in wavelength ascending order remain on the super channel on the working path, while the second and fourth carriers are redirected to the restoration path This way, the spectral distance between the carriers remaining in the super channel is increased, thereby decreasing performance losses due to nonlinear interference occurring for optical signals that are spectrally close to each other. This is an example of the general concept stated in the summary of the invention that the remainder of the data stream is transmitted within the super channel on the working path on a subset of the original n wavelengths, wherein in the subset wavelengths are missing which were mutually non-adjacent in the original set of n wavelengths. In other words, the remaining carriers and the carriers to be redirected are interleaved with each other.

The diagram on the bottom left shows a situation, where the data rate of one of the edge carriers (in the embodiment shown $\lambda_1$) is reduced, indicated by a narrow representation of the carrier in the spectrum, while the missing data rate is compensated for by transmission on the restoration path using an additional light source such as light source 12e shown in FIG. 4. The example on the bottom right shows a combination of the two previous scenarios.

Figure 6:
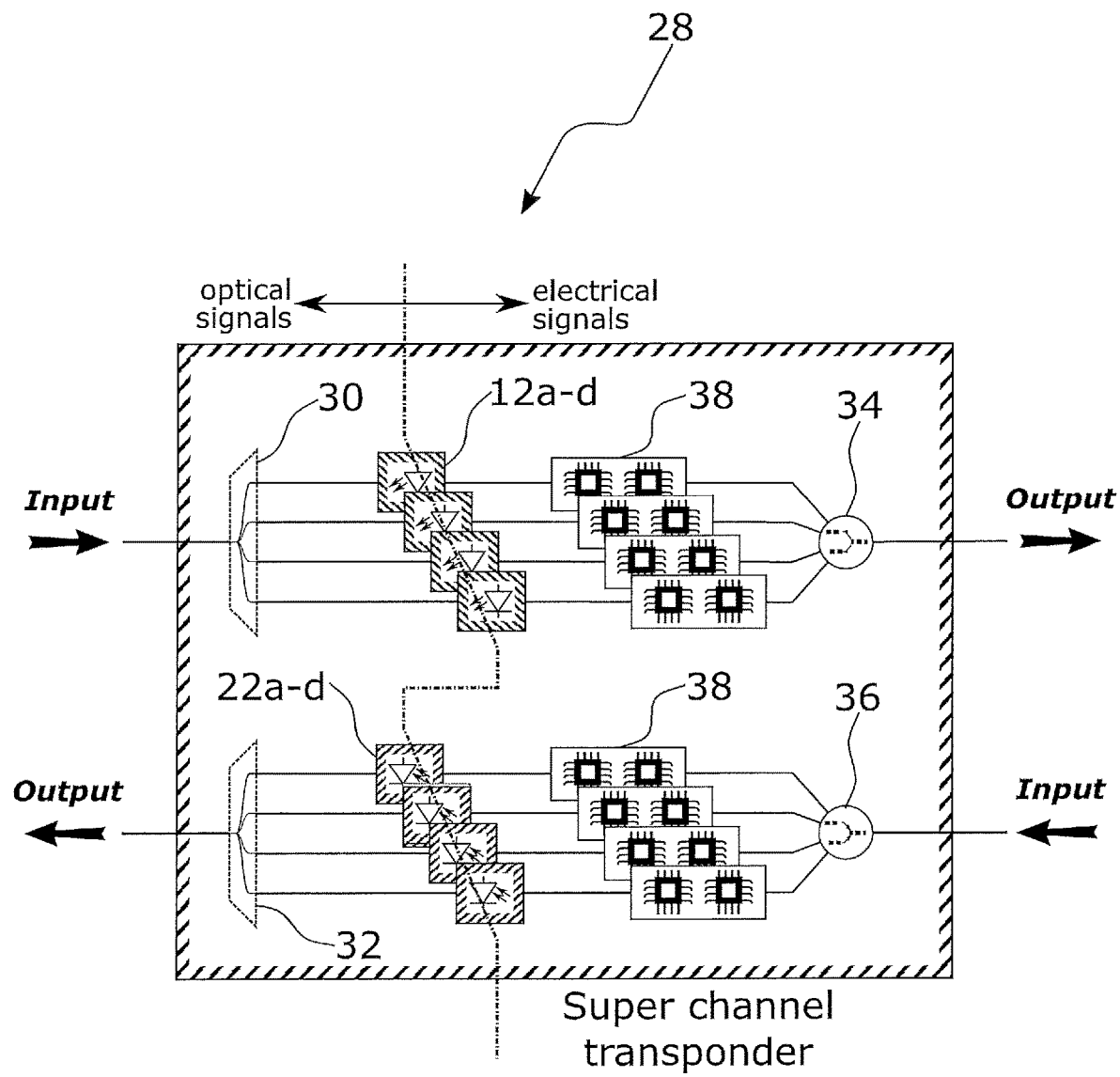
FIG. 6 shows a transponder for use in the present invention.

While in FIGS. 3 and 4 separate transmitting and receiving arrangements 10, 20 are shown, in various embodiments the invention will employ transponders, such as a super channel transponder as shown under reference sign 28 in FIG. 6. In the schematic representation of the transponder 28, the boundary between optical signals and electrical signals is indicated which runs right through the light sources 12a to 12d and receiver units 22a to 22d. Further shown in FIG. 6 is an optical demultiplexer 30, an optical multiplexer 32, an electrical multiplexer 34 and an electrical demultiplexer 36. The transponder 28 comprises buffers 38 for compensating for a difference in optical path lengths between the working path 16 and the restoration path 18. In the embodiment shown in FIG. 6, each buffer 38 has a size of Mbit. Assuming that a carrier originally transmits 100 Gbit/s and is then split into two 50 Gbit/s signals, then at a propagation time per kilometer of about 5 μs, the buffer must be able to store 250 kbit for each kilometer of path length difference. Accordingly, with the buffer size of 12.5 Mbit, a typical path length difference of 50 km can be compensated for. The buffers embedded in the electrical domain can be used for re-synchronizing data streams in order to form a single output signal. In the transponder 28 shown in FIG. 6, buffers 38 are provided both on the transmitter side and on the receive side. However, in simple, embodiments, it would be possible to provide the buffers 38 on only one of the transmit and receive side only.

Figure 7:
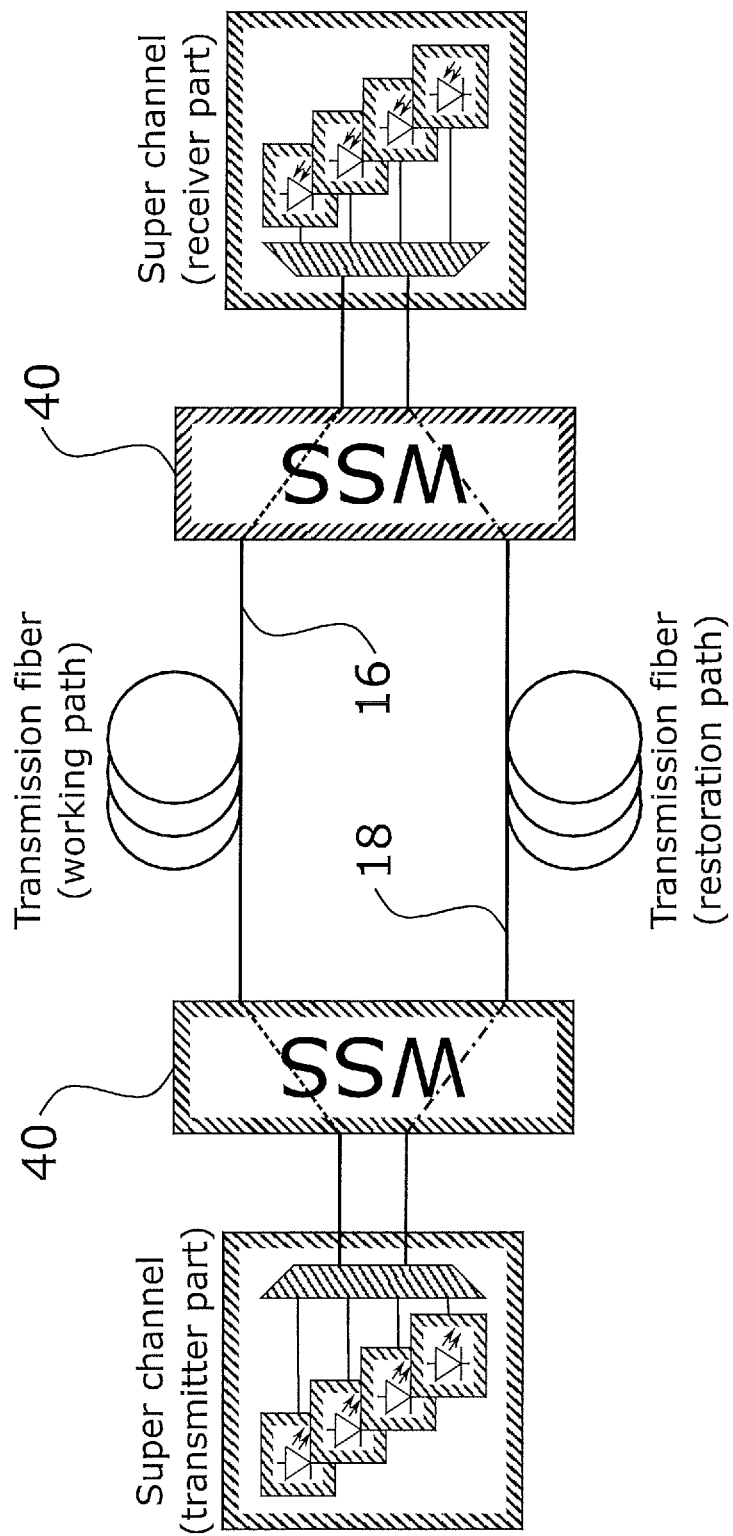
FIG. 7 shows an optical network according to an embodiment of the invention.

While in the embodiment shown in FIGS. 3 and 4 the transmitting arrangement 10 and receiving arrangement 20 contain the corresponding redirecting device 14, 24, such as a corresponding cyclic filter, this is not mandatory for practicing the invention. Namely, instead of providing such redirecting devices 14, 24 in the transmitting and receiving arrangements 10, 20, or on a corresponding transponder card, it is possible to carry out the combination of carriers for forming the super channels and redirecting of part of the data stream outside the transmitting and receiving arrangements 10, 20, using e.g. wavelength selective switches (WSS) 40, as schematically shown in FIG. 7.

The term "wavelength selective switch" is used in a broad sense here and comprises all kind of configurable routing devices that are designed for directing an incoming lightwave to one out of at least two output ports independent of other lightwaves entering the device at the same port but having different wavelength. Thus, the term is not limiting with respect to the used technology.

Modern transponders make use of coherent detection. Thus, the sub-channel detected by the receiver can be selected from the entire super-channel signal by tuning the local oscillator. This features is known in the art under the term of "coherent channel selection" and allows to use a simple splitter instead of the cyclic filter 24 in the receiving arrangement 20.

Figure 8:
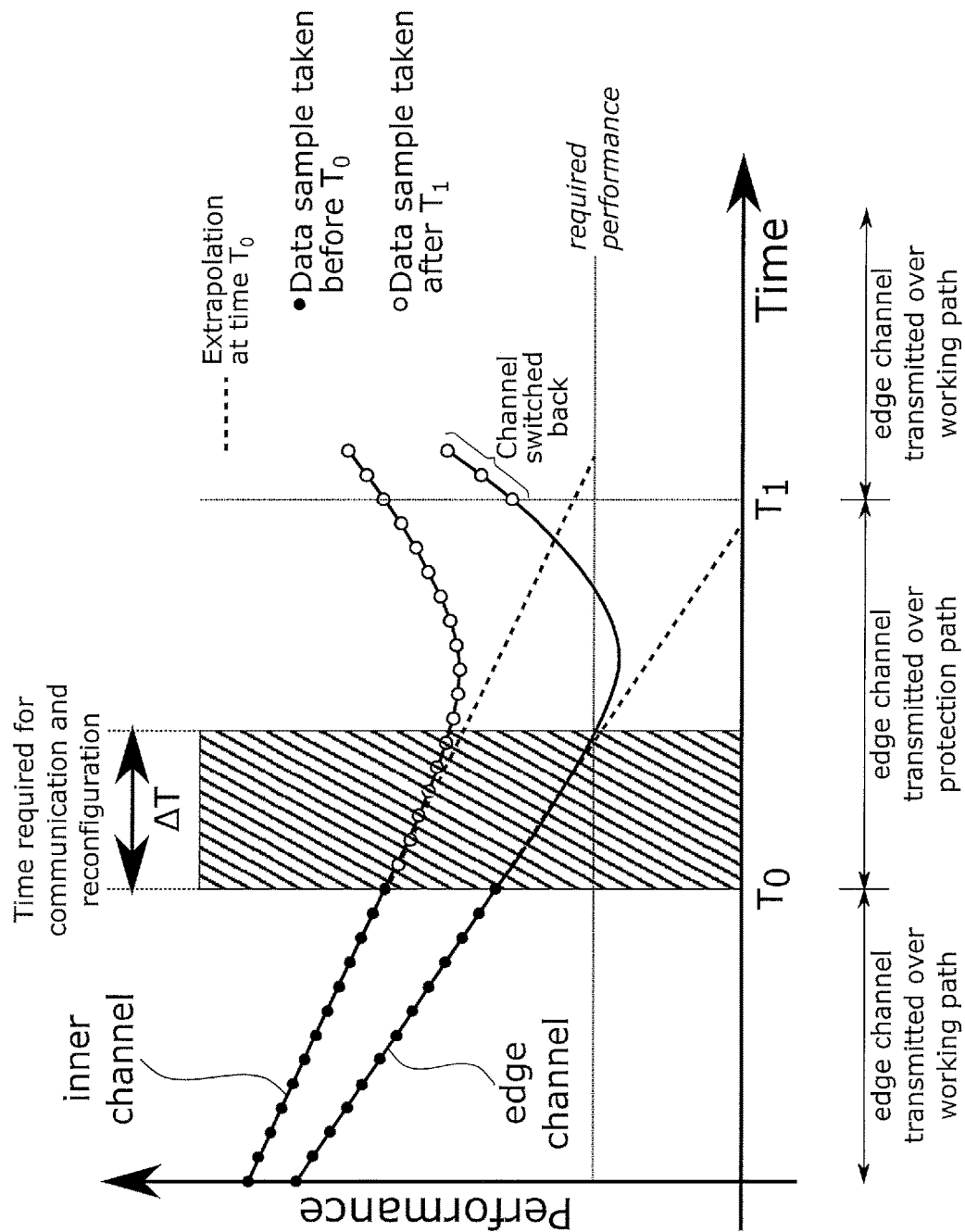
FIG. 8 shows a performance-time diagram for an edge carrier and an inner carrier of a super-channel and a performance extrapolation based thereon.

Finally, FIG. 8 shows a performance-time diagram for illustrating a method for proactive reconfiguration of the transmission according to an embodiment of the invention. In FIG. 8, two carriers or "sub-channels" of the super channel, namely an edge carrier and an inner carrier, are considered. Performance of the carriers is monitored continuously, wherein the measurement data are represented by black and white dots. On the left side of the time axis, the performance of both carriers degrades over time due to changes on the working path. As is seen in the diagram, the performance of the edge carrier is always worse than that of the inner carrier, because it is more exposed to filtering effects. Furthermore, the expected (extrapolated) performance at a time instant later by a time $\Delta T$ required for communication and rerouting to the restoration path is calculated continuously. At time $T_0$, the expected performance of the edge carrier at time $T_0+\Delta T$ drops below a threshold indicating the required performance. At this time, the edge carrier is switched to the restoration path, whereas the inner carrier having a higher performance is still transmitted as part of the super channel on the working path and is further monitored. The further evolution of the performance of the inner carrier represented by white dots is used to obtain an estimate of the theoretical performance of the edge carrier if it were transmitted on the working path. The required information on the correlation of the performance of the two carriers is derived from the behaviour observed before time $T_0$.

As is seen in FIG. 8, at some time after $T_0$, the performance observed for the inner carrier of the super channel on the working path is improving again, for example because some transient disturbance seizes to exist, or due to completion of maintenance work. At time $T_1$, the performance predicted for the edge carrier indicates that error-free data transmission of the edge carrier over the working path is possible, and the edge channel is switched back to the working path.

Figure 9:
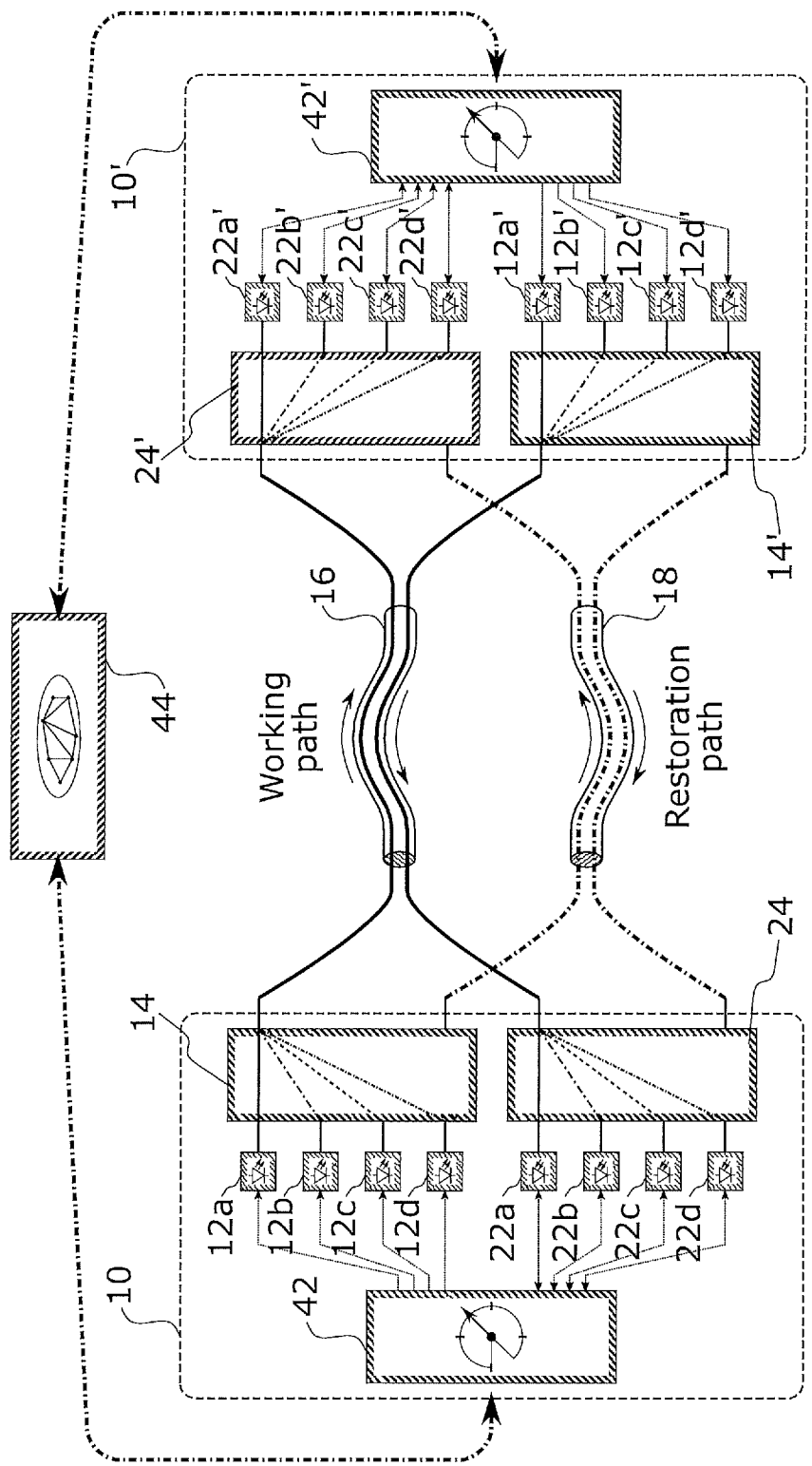
FIG. 9 shows an optical network comprising a performance monitoring unit according to an embodiment of the invention.

The function of a performance monitoring unit 42, 42' is detailed in the following by referring to the optical network shown FIG. 9. The embodiment shows a typical configuration of optical networks wherein data is transmitted bidirectionally by using fiber pairs. Via the working path 16, data is transmitted from a transponder 10 to a transponder 10' and vice versa. In the example shown, two separate fibers are used. However, using a single fiber for transmitting lightwaves in both directions would also be possible. Furthermore, different cores of a multi-core fiber or different modes of a few-mode fiber could be used. Both transponders comprise a transmitting part comprising transmitters 12a to 12d, 12a' to 12d' and a receiving part comprising receivers 22a to 22d, 22a' to 22d'. Furthermore, cyclic filters 14, 24, 14' and 24' are embedded in the respective transponder card for switching the data signals from the working path 16 to the restoration path 18. The function of these elements has already been described with reference to the previous figures and shall not be repeated again. Furthermore, the receivers 22a to 22d are connected to the performance monitoring unit 42 receiving performance related information from the receivers 22a to 22d and analysing them. Based on the result of this analysis, the performance monitoring unit 42 may initiate rerouting as for example described with reference to FIG. 5. A similar monitoring unit 42' is provided in the transponder 10'.

In case performance degradation is detected and there is a need for switching at least part of the traffic from the working path to the protection path, the transmitters on the opposite side of the optical link need to be instructed to change wavelength. Different solutions are known for this kind of information exchange. For example, if the performance monitoring unit 42 detects some performance degradation for the data transmission from transponder 10' to transponder 10, this information can be transmitted to the transmitters 12a' to 12d' via an in-band communication channel such as the general communication channel GCCo of a sub-channel transmitted from transponder 10 to transponders 10'. Most optical communication systems also provide an optical supervisory channel (OSC) that can be used for exchanging information between network elements and their cards. In addition, both transponders are connected to a telecommunications network management system (TNMS) 44. Since timing requirements are less strict when switching from a working path to a restoration path due to performance degration as compared to a complete traffic interruption, configuration data can also be exchanged via the TNMS 44. Furthermore, the connection to the TNMS 44 can also be used to make the restoration path available, for example by configuring some intermediate nodes such as photonic crossconnects comprising WSSes. Eventually, the changed wavelength information also needs to be communicated to the receiver. For example, when using coherent detection the wavelength of the local oscillator that is mixed with the received signal in order to generate an electrical signal carrying the transmitted information needs to be adapted.

Monitoring the performance of the data signals received by the receivers 22a to 22d is the key task of the performance monitoring unit 42. However, this unit can assume further tasks such as taking the decision to switch channels (at least partly) from the working path 16 to the restoration path 18. However, in alternative embodiments, these additional tasks can also be assumed by the controller of the respective network element or the TNMS 44. Furthermore, the performance monitoring unit does not need to be integrated in the transponder card. It is also possible to provide this functionality by a separate card.

Figure 10:
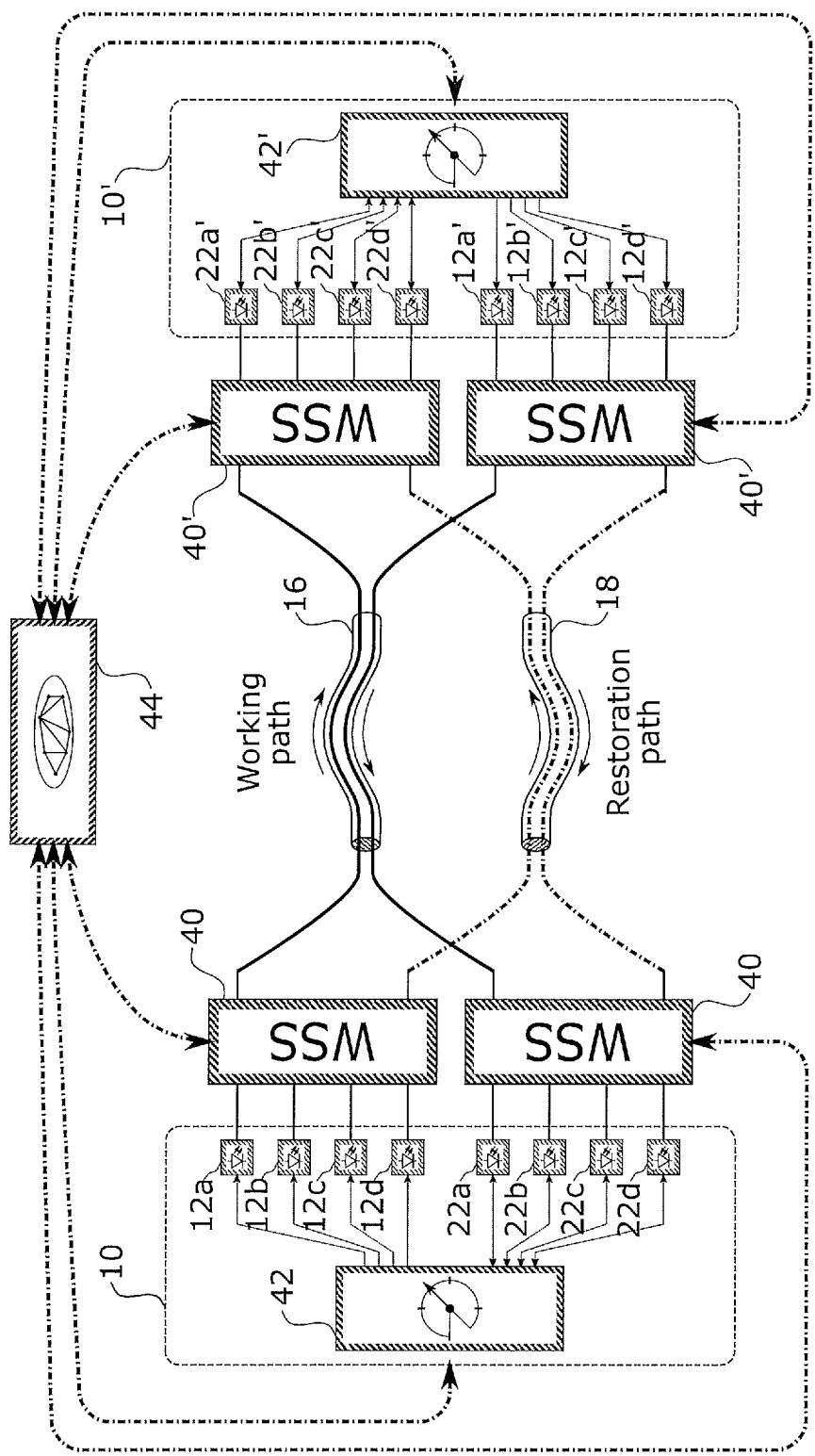
FIG. 10 shows an optical network comprising a performance monitoring unit according to an embodiment of the invention.

In the embodiment described above, the transponder determines the used optical path (working path or protection path) by setting the wavelengths of the transponders. However, the optical path might also be selected by means of WSSes, as already explained with reference to FIG. 7. FIG. 10 shows a related setup comprising the performance monitoring units 42 and 42' as well as the TNMS 44. In this example, the TNMS 44 receives performance data from the performance monitoring units 42 and 42' and instructs the WSSes accordingly. If the transponder forms part of the same optical network element as the WSS determining the optical path (transponder 10 and WSSes 40, transponder 10' and WSSes 10'), it is also possible to provide communication between the transponders and the WSSes via communication channels that are internal to the optical network elements.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

The invention claimed is:

1. A method of transmitting a data stream from a first location to at least a second location through an optical network, comprising the steps of:
 transmitting the data stream from the first location to at least the second location along a working path established in the optical network, wherein the data stream is transmitted within a super channel comprising a number of n wavelengths within a predefined reserved wavelength range that are employed to transmit the data stream along the working path;
 monitoring the super channel to monitor a performance level of the transmission along the working path of the data stream; and
 in the event of a drop in the monitored performance level below a predetermined performance threshold, unburdening the super channel from a part of the data stream while maintaining on the working path the reserved wavelength range for the super channel, wherein the step of unburdening comprises:
  redirecting the part of the data stream for transmission from the first location to the second location along at least one restoration path, the at least one restoration path being a different optical path from the working path;
  transmitting the part of the data stream from the first location to the second location along the at least one restoration path; and
  transmitting, along the working path and within the super channel, a remainder of the data stream, wherein at least one of the following:
   fewer than all n wavelengths of the super channel are employed to transmit the remainder of the data stream,
   a second transmission rate is employed, for at least one of the wavelengths in the super channel, that is a reduced transmission rate for the at least one wavelength relative to a first transmission rate employed for the at least one wavelength prior to the step of unburdening the super channel.

2. The method of claim 1, wherein the part of the data stream from which the super channel is unburdened is chosen such that the transmission of the remainder of the data stream within the super channel is at a performance level that exceeds the predetermined performance threshold.

3. The method of claim 1, further comprising the steps of additionally monitoring a performance level of the transmission of the part of the data stream that is redirected along the at least one restoration path and additionally monitoring a performance level of the transmission of the remainder of the data stream, and dynamically adjusting respective shares of the data stream that the part of the data stream and the remainder of the data stream each comprise is based on at least one of:
 the monitored performance level of the part of the data stream,
 the monitored performance level of the remainder of the data stream.

4. The method of claim 1, wherein the part of the data stream that is redirected is transmitted along the at least one restoration path with a transmission rate per wavelength that is a reduced transmission rate per wavelength as compared to the highest transmission rate per wavelength of the super channel on the working path.

5. The method of claim 1, wherein at least one of:
 an edge carrier wavelength of the super channel is not among the fewer than all n wavelengths of the super channel employed for the transmission of the remainder of the data stream,
 both of two edge carrier wavelengths of the super channel are not among the fewer than all n wavelengths of the super channel employed for the transmission of the remainder of the data stream,
 at least two mutually non-adjacent wavelengths, among the n wavelengths of the super channel, are not among the fewer than all n wavelengths of the super channel employed for the transmission of the remainder of the data stream.

6. The method of claim 1, wherein the part of the data stream that is redirected is transmitted along the at least one restoration path within a super channel.

7. The method of claim 1, wherein the performance level of the data stream is monitored by analyzing at least one of the following performance indicators associated with the super channel:
 high error rate contributor (HERC),
 signal-to-noise-ratio (SNR),
 power spectral density (PSD),
 pre-forward-error-correction (FEC) bit error rate,
 post-FEC bit error rate,
 rate of corrected symbols,
 peak-to-average ratio,
 error vector magnitude (EVM).

8. The method of claim 1, wherein the predetermined performance threshold is chosen according to a service level agreement.

9. The method of claim 1, wherein the data stream comprises a predefined amount of data traffic under a service level agreement.

10. The method of claim 1, wherein the redirecting of the part of the data stream is accomplished at least in part using wavelength selective switches.

11. The method of claim 1, wherein the redirecting of the part of the data stream is accomplished at least in part using a cyclic filter in combination with a wavelength control.

12. The method of claim 1, further comprising a step of buffering one of the part of the data stream and the remainder of the data stream to compensate for a difference between an optical path length of the working path and an optical path length of the at least one restoration path.

13. The method of claim 1, further comprising a step of reducing a transmission rate from the first transmission rate to the second transmission rate for the at least one that is accomplished at least in part by changing at least one of:
 a modulation format an optical signal that corresponds to the at least one wavelength,
 a symbol rate of an optical signal that corresponds to the at least one wavelength.

14. The method of claim 1, further comprising a step of establishing the at least one restoration path in response to a determination that the monitored performance level of the data stream is approaching the predetermined performance threshold.

15. A performance monitoring system for monitoring and controlling a transmission of a data stream from a first location to at least a second location through an optical network, wherein the performance monitoring unit is configured to carry out steps comprising:
 monitoring a super channel to monitor a performance level of a transmission of the data stream from the first location to at least the second location along a working path established in the optical network wherein the super channel comprises a number of n wavelengths within a predefined reserved wavelength range that are employed to transmit the data stream along the working path; and
 in the event of a drop in the monitored performance level below a predetermined performance threshold, unburdening the super channel from a part of the data stream while maintaining on the working path the reserved wavelength range for the super channel, wherein the step of unburdening comprises controlling components within the optical network to:
  redirect the part of the data stream for transmission from the first location to the second location along at least one restoration path, the at least one restoration path being a different optical path from the working path;
  transmit the part of the data stream from the first location to the second location along the at least one restoration path; and
  transmit, along the working path and within the super channel, a remainder of the data stream, wherein at least one of the following:
   fewer than all n wavelengths of the super channel are employed to transmit the remainder of the data stream,
   a second transmission rate is employed, for at least one of the wavelengths in the super channel, that is a reduced transmission rate for the at least one wavelength relative to a first transmission rate employed for the at least one wavelength prior to the step of unburdening the super channel.

16. The performance monitoring system of claim 15, further configured for controlling components within the optical network for redirecting the part of the data stream such that the transmission of the remainder of the data stream within the super channel is at a performance level that exceeds the predetermined performance threshold.

17. The performance monitoring system of claim 15, further configured for additionally monitoring a performance level of the transmission of the part of the data stream that is redirected along the at least one restoration path and additionally monitoring a performance level of the transmission of the remainder of the data stream, and for controlling components within the optical network for dynamically adjusting respective shares of the data stream that the part of the data stream and the remainder of the data stream each comprise is based on at least one of:
 the monitored performance level of the part of the data stream,
 the monitored performance level of the remainder of the data stream.

18. The performance monitoring system of claim 15, further configured for controlling components within the optical network for transmitting the part of the data stream that is redirected along the at least one restoration path with a transmission rate per wavelength that is a reduced transmission rate per wavelength as compared to the highest transmission rate per wavelength of the super channel on the working path.

19. The performance monitoring system of claim 15, further configured for controlling components within the optical network for transmitting within a super channel the part of the data stream that is redirected along the at least one restoration path.

20. The performance monitoring system of claim 15, further configured for monitoring the performance by analyzing at least one of the following performance indicators associated with the super channel:
 high error rate contributory contributor (HERC),
 signal-to-noise-ratio (SNR),
 power spectral density (PSD),
 pre-forward-error-correction (FEC) bit error rate,
 post-FEC bit error rate,
 rate of corrected symbols,
 peak-to-average ratio,
 error vector magnitude (EVM).

21. The performance monitoring system of claim 15, further configured for establishing the at least one restoration path in response to a determination that the monitored performance level of the data stream is approaching the predetermined performance threshold.

22. The performance monitoring system of claim 15, further configured for establishing at a first point in time a prediction for a future state of performance at a second point in time that, relative to the first point in time, extends into the future by at least an amount of time required to carry out the step of unburdening the super channel.

23. A transmitting arrangement for transmitting a data stream from a first location to a second location through an optical network wherein the transmitting arrangement comprises:
 at least one transmitter configured to transmit the data stream through an optical network from a first location to at least a second location along a working path established in the optical network, wherein the at least one transmitter is configured to transmit the data stream within a super channel comprising a number of n wavelengths within a reserved wavelength range that are employed to transmit the data stream along the working path;
 a redirecting device configured to respond to an occurrence of a pre-determined change, in a performance level of the transmission along the working path of the data stream, by redirecting a part of the data stream for transmittal from the first location to the second location along at least one restoration path, the at least one restoration path being a different optical path from the working path;

wherein the occurrence of the pre-determined change in the performance level of the transmission along the working path of the data stream is identified at least in part by monitoring the super channel;

wherein the transmitting arrangement is further configured to, in the event of the occurrence of the pre-determined change in the monitored performance level of the transmission along the working path of the data stream:

maintain on the working path the reserved wavelength range for the super channel, transmit the part of the data stream from the first location to the second location along the at least one restoration path, and transmit a remainder of the data stream along the working path and within the super channel, wherein at least one of the following:

fewer than all n wavelengths of the super channel are employed to transmit the remainder of the data stream, a second transmission rate is employed, for at least one of the wavelengths in the super channel, that is a reduced transmission rate for the at least one wavelength relative to a first transmission rate employed for the at least one wavelength prior to the occurrence of the pre-determined change in the monitored performance level of the transmission along the working path of the data stream.

24. The transmitting arrangement of claim 23, wherein the redirecting device comprises at least one cyclic filter.

25. The transmitting arrangement of claim 23, wherein the redirecting device comprises at least one wavelength selective switch (WSS).

26. The transmitting arrangement of claim 23, wherein the at least at least one transmitter is configured to emit light at each of the n wavelengths of the super channel.

27. The transmitting arrangement of claim 23, wherein the at least one transmitter further comprises:

at least n light sources each configured to emit a respective carrier among the n wavelengths of the super channel;

at least one modulator configured to generate the data stream for optical transmission; and at least one additional light source, wherein each at least one additional light source is configured to emit light at at least one of the n wavelengths of the super channel.

28. The transmitting arrangement of claim 23, wherein the reserved wavelength range has a width of between 0.8 and 5.0 nm.

29. The transmitting arrangement of claim 23, wherein each of the n wavelengths are spaced apart, from at least one adjacent other of the n wavelengths, by a frequency difference of between 20 GHz and 100 GHz.

30. The transmitting arrangement of claim 23, wherein each of the n wavelengths carry a portion of the data stream at a transmission rate between 40 Gbit/s and 1 Tbit/s.

31. A receiving arrangement configured for receiving from an optical network a data stream transmitted by a transmitting arrangement, wherein the receiving arrangement is configured to receive:

in a first state of the receiving arrangement, the data_stream, transmitted to the receiving arrangement along a working path of the optical network and within a super channel comprising a number of n wavelengths within a predefined reserved wavelength range, and in a second alternative state of the receiving arrangement:

a part of the data stream from at least one restoration path of the optical network, the at least one restoration path being a different optical path from the working path, and a remainder of the data stream from the working path and within the super channel, wherein at least one of the following:

fewer than all n wavelengths of the super channel are employed in transmitting the remainder of the data stream to the receiving arrangement, a second transmission rate is employed, for at least one of the wavelengths in the super channel, that is a reduced transmission rate for the at least one wavelength relative to a first transmission rate employed for the at least one wavelength in the first state of the receiving arrangement;

wherein the receiving arrangement further comprises at least one buffer configured to buffer the redirected part of the data stream and the remainder of the data stream to compensate for a difference between an optical path length of the working path and an optical path length of the at least one restoration path.

* * * * *